(12) United States Patent
Vargas

(10) Patent No.: US 11,577,545 B1
(45) Date of Patent: Feb. 14, 2023

(54) WHEEL ASSEMBLY FOR HEAVY LOAD TIRES

(71) Applicant: Eladio A. Vargas, Glenview, IL (US)

(72) Inventor: Eladio A. Vargas, Glenview, IL (US)

( * ) Notice: Subject to any disclaimer, the term of this patent is extended or adjusted under 35 U.S.C. 154(b) by 0 days.

(21) Appl. No.: 17/868,687

(22) Filed: Jul. 19, 2022

Related U.S. Application Data

(60) Provisional application No. 63/323,746, filed on Mar. 25, 2022.

(51) Int. Cl.
*B60B 25/20* (2006.01)
*B60B 3/08* (2006.01)
*B60B 25/02* (2006.01)
*B60B 35/00* (2006.01)

(52) U.S. Cl.
CPC .............. *B60B 25/20* (2013.01); *B60B 3/085* (2013.01); *B60B 25/02* (2013.01); *B60B 35/00* (2013.01); *B60B 2900/711* (2013.01)

(58) Field of Classification Search
CPC ..... B60B 25/00; B60B 25/002; B60B 25/008; B60B 25/02; B60B 25/04; B60B 25/045; B60B 25/08; B60B 25/14; B60B 25/20; B60B 3/08; B60B 3/087
See application file for complete search history.

(56) References Cited

U.S. PATENT DOCUMENTS

| | | | |
|---|---|---|---|
| 3,802,744 A | 4/1974 | Grawey et al. | |
| 3,910,336 A | 10/1975 | Boileau | |
| 4,096,900 A | 6/1978 | Olsen | |
| 4,214,941 A * | 7/1980 | Horr | B29D 30/26 |
| | | | 156/416 |
| 4,323,414 A | 4/1982 | Severson | |
| 4,505,314 A * | 3/1985 | Goudy | B60B 21/10 |
| | | | 152/398 |
| 4,706,723 A | 11/1987 | Loeber et al. | |
| 4,794,970 A | 1/1989 | Huinink et al. | |
| 5,083,597 A * | 1/1992 | France | B60B 25/14 |
| | | | 152/410 |
| 5,837,073 A | 11/1998 | Cauquot et al. | |
| 6,311,749 B1 | 11/2001 | Taylor | |
| 6,422,280 B1 | 7/2002 | Thomas | |
| 10,350,940 B2 * | 7/2019 | Zeisler | B60B 23/10 |

(Continued)

FOREIGN PATENT DOCUMENTS

WO 2014088553 A1 6/2014

*Primary Examiner* — Jason R Bellinger
(74) *Attorney, Agent, or Firm* — John Rizvi, P.A.

(57) ABSTRACT

A wheel assembly provides an expanded air-pressurization chamber to increase the load capacity of the mounted tire. The wheel assembly includes an axle shaft, including flange plates mounted at opposite ends of the shaft and a mounting disc attached to each flange plate. There is an annular-shaped locking ring attached to each mounting disc. A cylindrical insert assembly is mounted between the pair of locking rings. A central section is defined in the tubular body extending between a pair of annular flange wall portions and includes an array of holes. The tire bead at each inner edge of a tire is located within the annular bead-receiving channels formed between the locking ring and insert assembly. A dual air-pressurization chamber is formed, one radially outward and the other radially inward of the tubular body of the insert assembly.

20 Claims, 15 Drawing Sheets

(56) References Cited

U.S. PATENT DOCUMENTS

| | | | |
|---|---|---|---|
| 11,325,417 B2* | 5/2022 | Kemeny | B60B 9/02 |
| 11,458,759 B2* | 10/2022 | Kemeny | B60B 9/02 |
| 2003/0080609 A1* | 5/2003 | Darnell | B60B 25/08 |
| | | | 301/95.11 |
| 2009/0151876 A1* | 6/2009 | Rider | B60B 25/12 |
| | | | 157/1.33 |
| 2010/0194180 A1 | 8/2010 | Gibson | |
| 2014/0265537 A1 | 9/2014 | Taylor | |
| 2020/0122503 A1* | 4/2020 | Taylor | B60B 25/08 |

* cited by examiner

WHEEL ASSEMBLY FOR HEAVY LOAD TIRES

CROSS-REFERENCE TO RELATED APPLICATIONS

This application claims the benefit of U.S. Provisional Patent Application Ser. No. 63/323,746, filed on Mar. 25, 2022, which is incorporated herein in its entirety.

FIELD OF THE INVENTION

The present invention relates generally to tire wheels, and more particularly, to a wheel assembly especially adapted for industrial-sized tires, which allows for tubeless tires to have short lateral walls and create an expanded hermetic air chamber design that increases the load capacity of the wheel assembly.

BACKGROUND OF THE INVENTION

Tire and wheel construction is a complex and technical field that many are unaware of. Heavy-duty vehicles designed to carry heavy loads, such as the highest payload capacity haul trucks BelAz, require wheels and tires that are strong enough to support the heavy loads and shear forces they are subjected to by the vehicle and terrain when in use.

The standard rim design for pneumatic tires has contributed significantly to the transportation and construction business over the past decades. The wheel and rim designs are simple, efficient, and dependable. Consequently, there has been a minimal progression in tire and wheel construction. If there are changes to the structure of wheels and tires, the changes are cosmetic or materialistic, i.e., adopting new materials to perform existing functions. Radical changes, however, to the standard wheel and tire construction are almost non-existent. That is because the complexity and cost of change greatly revolve around the technical manufacturing complexity involved in strengthening the walls of tires for large rigs and how the tires can be modified without affecting their functionality and performance. Nevertheless, there is still a substantial need in the industry for a wheel and tire construction that can sustain more efficiently the heavy loads and shear forces it is subjected to when performing.

Accordingly, there is an established need for a wheel design that features an expanded tire-inflating air compression chamber, increases the tires' load capacity, and has a shorter sidewall that improves the performance of the wheel construction.

SUMMARY OF THE INVENTION

The present invention is directed to a wheel assembly for use in combination with a vehicle tire. The wheel assembly includes an axle assembly configured to fit onto the solid axle shaft or other suitable driveline component of a vehicle. The axle assembly includes an elongate, hollow axle shaft and a pair of solid, circular flange plates that are disposed at opposite ends of the axle shaft in an orthogonal, concentric relationship to the shaft. A seal is preferably disposed at the outer-facing side of a respective flange plate. A pair of solid mounting discs are disposed at the outer-facing side of a respective flange plate seal. A pair of locking rings are then disposed at the outer-facing side of a respective mounting disc. Each locking ring has an annular shape and includes an inner side facing the mounting disc, an outer side, and a central opening extending between the inner side and the outer side. An annular flange rib projects from the inner side of the locking ting and extends in the axial direction towards the axle assembly. The flange rib is orthogonal to the inner side of the locking ring. The flange rib divides the inner side of the locking ting into an outer annular portion disposed radially outward of the flange rib and an inner annular portion disposed radially inward of the flange rib.

A cylindrical insert assembly is provided. The insert assembly includes an open-ended tubular body having an inner side and an outer side each extending between a pair of circular end edges. The insert assembly further includes a pair of annular, radially-extending, flange wall portions each projecting orthogonally from the outer side of the tubular body proximal one of the circular end edges. The pair of opposing, spaced-apart, flange wall portions divides the tubular body into a central portion extending between the pair of flange wall portions and a pair of annular end portions each disposed axially outward of a respective flange wall portion. A plurality of through-holes are formed in the central portion of the tubular body. The wheel assembly adopts an assembled configuration in which the cylindrical insert assembly is disposed between the pair of locking rings in a generally concentric relationship about the axle assembly. In this configuration, each one of the pair of annular, radially-extending, flange wall portions of the cylindrical insert assembly is disposed in opposing, facing, spaced-apart relationship to the annular outer portion at the inner side of a respective locking ring to define an annular, tire bead-receiving channel therebetween.

A tire is mounted to the wheel assembly by locating the annular bead structure at its inner tire edge within a respective one of the bead-receiving channels formed in the wheel assembly between the locking ring and the insert assembly. In one form, the cylindrical insert assembly is partitioned into a set of individual, discrete, insert sections. The wheel assembly and tire combination forms a dual air-pressurization chamber. A first, outer chamber is defined between the outer side of the tubular body of the cylindrical insert assembly and an interior surface of the tire mounted on the wheel assembly. A second, inner chamber is defined radially inward from the inner side of the tubular body of the cylindrical insert assembly. The second, inner chamber is disposed in fluid communication with the first, outer chamber via the plurality of holes formed in the central portion of the tubular body of the cylindrical insert assembly, which enables the second, inner chamber to be pressurized as the first, outer chamber is pressurized.

Introducing a first embodiment of the invention, the present invention consists of a wheel assembly, comprising:
an axle assembly including an axle shaft, a pair of circular flange plates disposed at opposite ends of the axle shaft, and a pair of seals each disposed at an outer side of a respective flange plate;
a pair of mounting discs each disposed at the outer side of a respective seal of the axle assembly;
a pair of locking rings each disposed at the outer side of a respective mounting disc, each locking ring including:
  an inner side,
  an outer side,
  a central opening extending between the inner side and the outer side,
  an annular, axially-extending, flange rib projecting from the inner side of the locking ring, and
  wherein the inner side of the locking ring includes an annular outer portion disposed radially outward of the flange rib and an annular inner portion disposed radially inward of the flange rib;

a cylindrical insert assembly including:
 a tubular body having an inner side and an outer side,
 a pair of axially spaced-apart, annular, radially-extending, flange wall portions projecting from the outer side of the tubular body,
  wherein the tubular body includes a central portion extending between the pair of flange wall portions and a pair of annular end portions each disposed axially outward of a respective flange wall portion, and
 a plurality of holes formed in the central portion of the tubular body;
 wherein the wheel assembly adopts an assembled configuration in which the cylindrical insert assembly is disposed between the pair of locking rings and generally concentric about the axle assembly so that each one of the pair of radially-extending flange wall portions of the cylindrical insert assembly is disposed in opposing, facing, spaced-apart relationship to the annular outer portion at the inner side of the locking ring associated therewith to define an annular, tire bead-receiving channel therebetween.

In a second aspect, the axle shaft of the axle assembly includes a hollow sleeve structure having an interior surface formed with a plurality of axially-extending, circumferentially spaced-apart, attachment splines.

In another aspect, each locking ring is sized and shaped so that its annular, axially-extending, flange rib is disposed about the periphery of the mounting disc associated therewith during assembly.

In another aspect, the cylindrical insert assembly may include a partitioned or segmented portion cooperatively forming a tubular body.

In another aspect, during adoption of the assembled configuration of the wheel assembly, each one of the pair of annular end portions of the tubular body of the cylindrical insert assembly is annularly seated in a radially-outward relationship about the annular, axially-extending, flange rib of the locking ring associated therewith.

In another aspect, the wheel assembly is used in combination with a tire having a central opening defined by a pair of inner edges each carrying a respective bead assembly. The wheel assembly adopts a tire-mounting configuration in which each bead assembly of the tire is located at least partially within a respective annular, tire bead-receiving channel.

In yet another aspect, the wheel assembly includes: a first, air-pressurizable, outer chamber defined between the outer side at the central portion of the tubular body of the cylindrical insert assembly and an interior surface of the tire mounted on the wheel assembly; and, a second, air-pressurizable, inner chamber disposed in fluid communication with the first, outer chamber via the plurality of holes formed in the central portion of the tubular body of the cylindrical insert, assembly and defined radially inward from the inner side at the central portion of the tubular body of the cylindrical insert assembly.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. The term "about" is within plus or minus 3 percent. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a wheel assembly, configured to provide a wheel to support and lock the beads of large and heavy-load tubeless tires, more particularly those with very short sidewalls, increase the total load capacity of the assembly by creating a hermetic internal air chamber which is in fluid communication with the tire's internal space and allows to be pressurized within a large range of pneumatic pressures. The present design of the instant invention can increase the tire rating of operation tires of 100 tons by about 10 to 30 percent.

Figure 1:
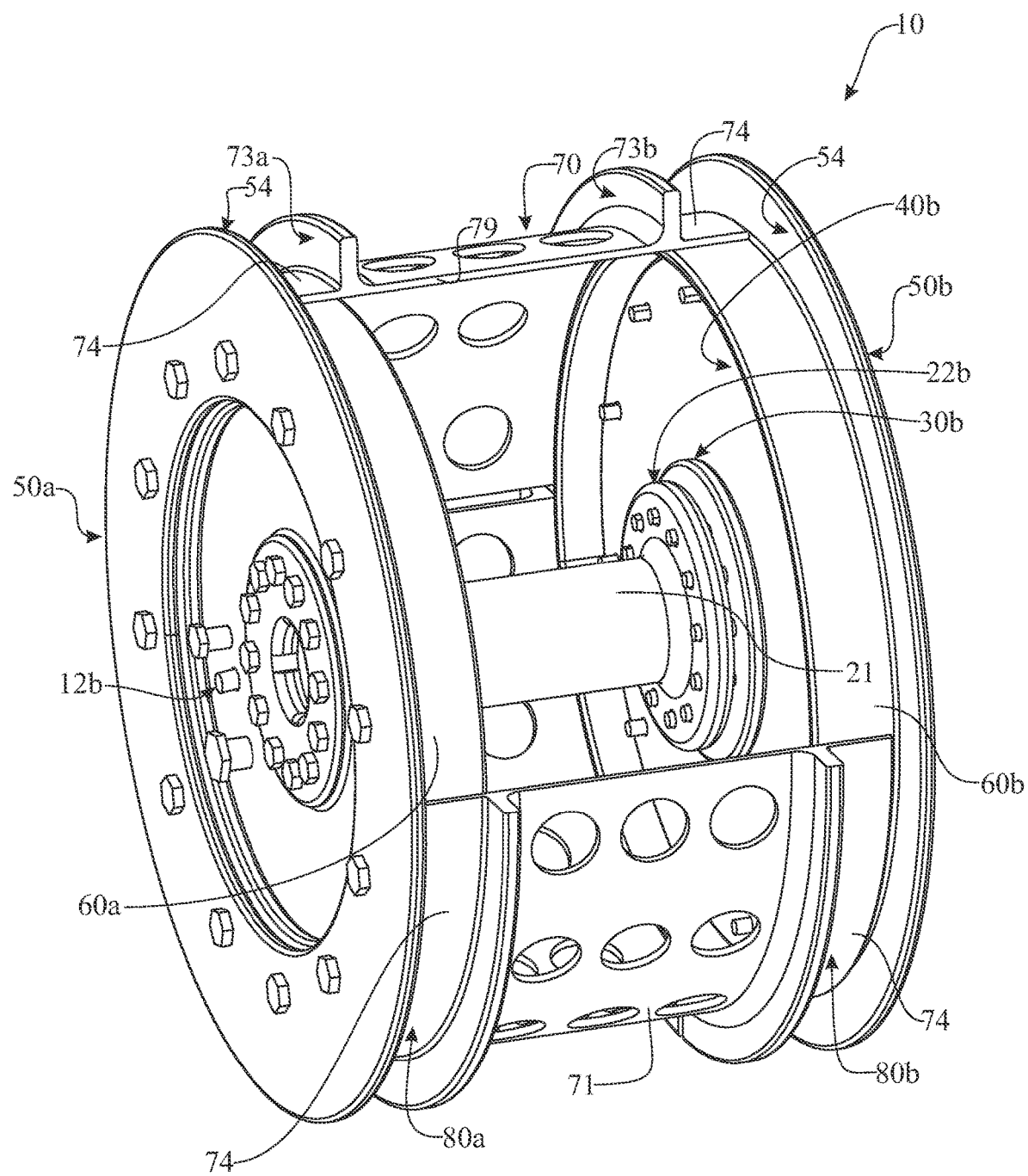
FIG. 1 presents a longitudinal, perspective, cutaway view showing a first embodiment of the wheel assembly of the present invention, illustrating the wheel assembly in its fully assembled condition except for the removal of one of the perforated insert sections to reveal the innermost air chamber.
Figure 2:
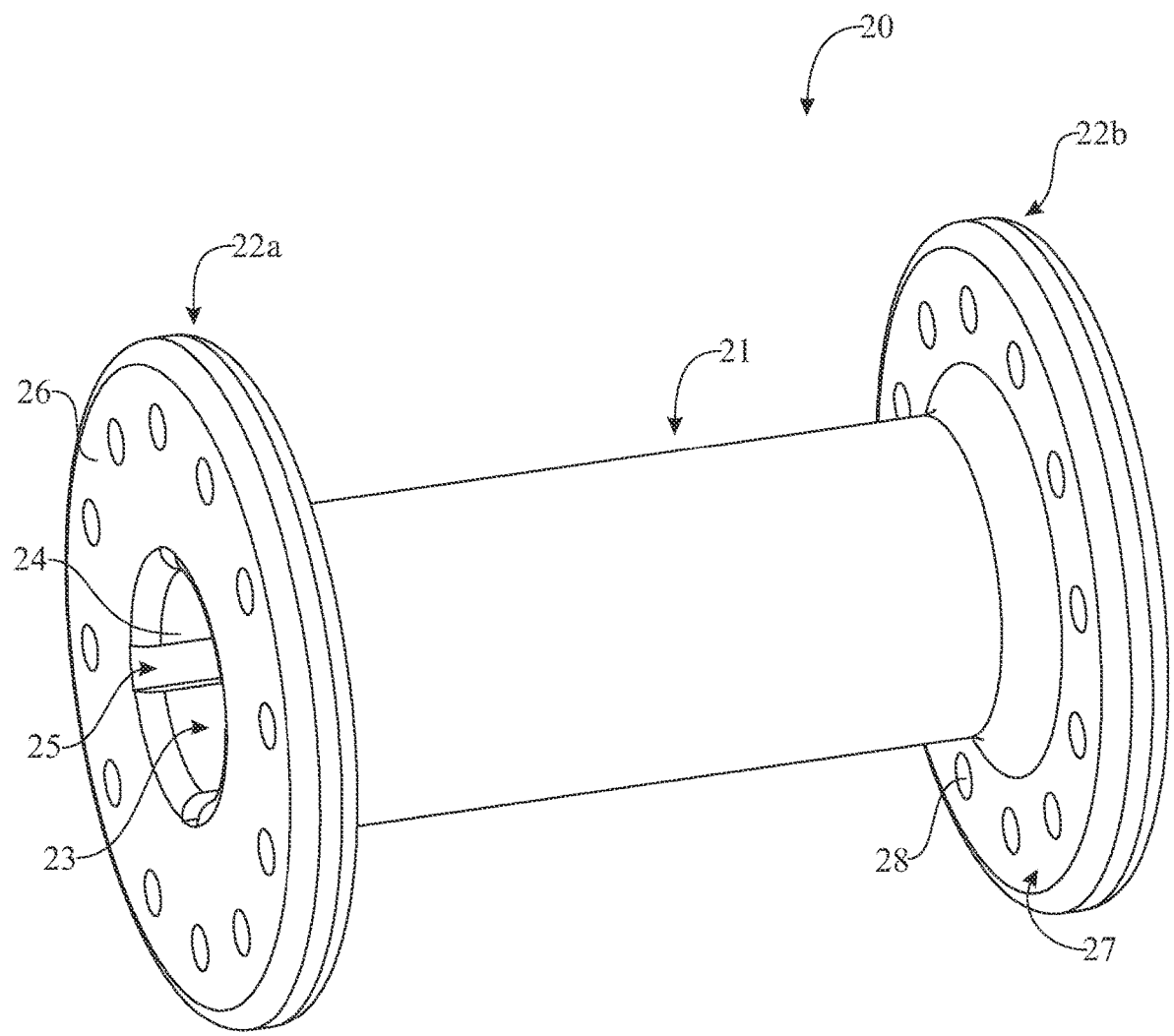
FIG. 2 presents a longitudinal, perspective view showing an axle assembly forming part of the wheel assembly originally disclosed in FIG. 1, illustrating a sleeve-type axle shaft in combination with a pair of end-mounted flange plates.
Figure 3:
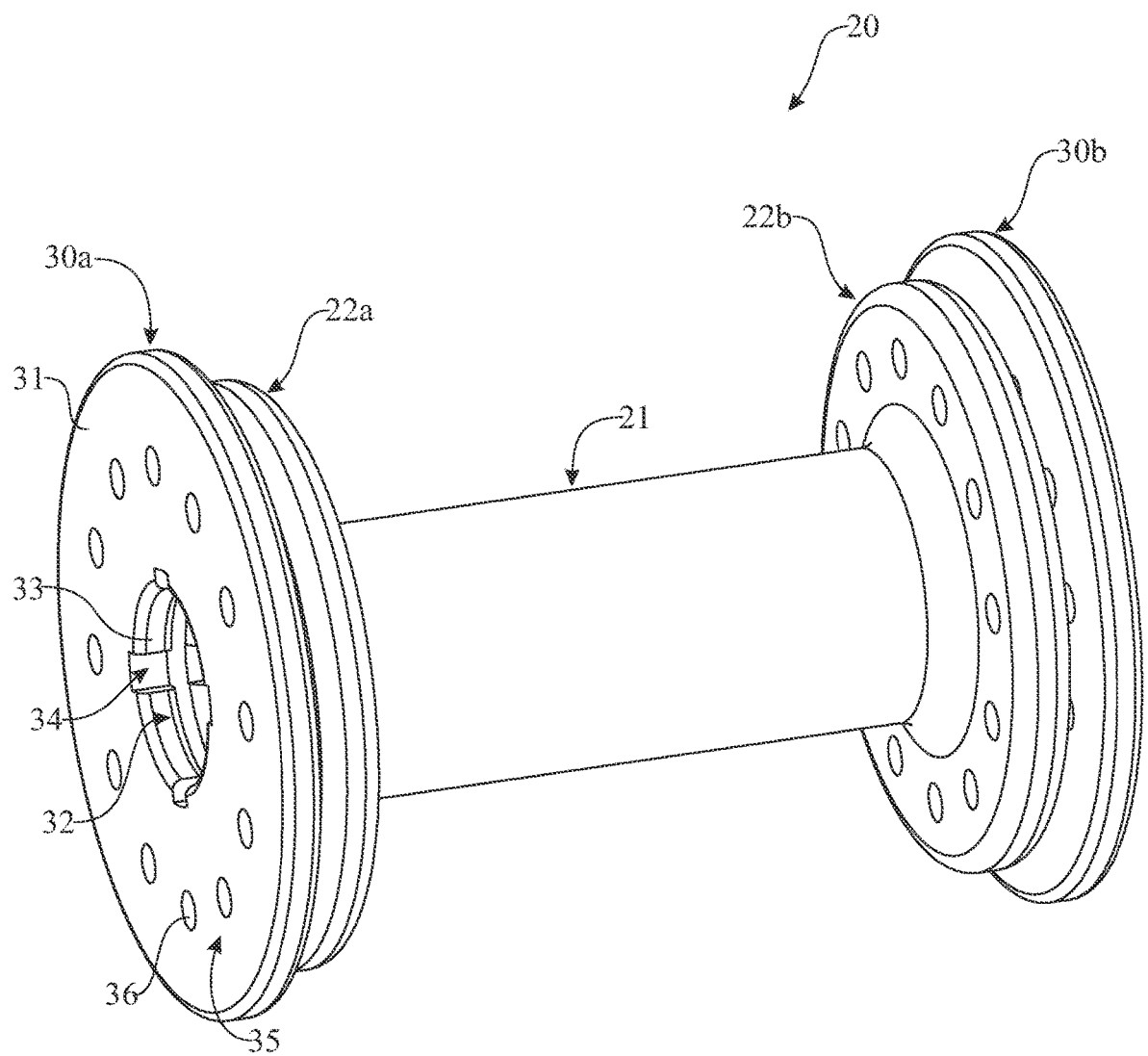
FIG. 3 presents a longitudinal, perspective view of the axle assembly shown in FIG. 2 further configured with a pair of seal elements mounted to the outer-facing sides of the flange plates.

Referring initially to FIGS. 1-3, a wheel assembly 10 is disclosed according to a first embodiment of the present invention. Referring particularly to FIGS. 2-3 the wheel assembly 10 includes an axle assembly 20 comprising, in combination, an axle shaft 21 and a pair of flange plates 22a,b disposed at opposite ends of axle shaft 21 in a concentric, orthogonal relationship. The axle assembly 20 functions as a mounting unit to provide attachment of the wheel assembly 10 to a suitable component of a vehicle, such as a driveline structure (e.g., solid axle, transmission shaft). For this purpose, axle shaft 21 is provided as an open-ended, hollow, sleeve-like, tubular structure having an interior, longitudinal, vehicle axle-receiving space 23. The interior space 23 is defined by an interior surface 24. The axle shaft 21 is preferably equipped with a set of circumferentially spaced-apart, axially-extending, male-type, longitudinal splines 25 formed at the interior surface 24, which cooperatively interact with a corresponding set of matching or complementary grooves formed in the vehicle component (solid axle) to which wheel assembly 10 is mounted. During installation of wheel assembly 10, for example, the axle shaft 21 undergoes a sliding displacement onto the solid axle of the vehicle, such that the set of longitudinal splines 25 align with the complementary grooves formed in the vehicle solid axle. In a conventional manner, the splines 25 interfit within the grooves and rotationally lock the axle shaft 21 to the vehicle solid axle, enabling the wheel assembly 10 to rotate in unison with the vehicle solid axle. Although a spline arrangement is disclosed as the means for installing wheel assembly 10 to a vehicle solid axle, other conventional installation arrangements are possible within the scope of the invention which endeavor to rotationally couple the axle shaft 21 to a corresponding axle structure in a vehicle. In an alternate arrangement, the axle shaft 21 can be fitted with female-type grooves formed at its interior surface 24 (rather than splines 25), in which case the vehicle motor axle includes a complementary set of groove-fitting splines that engage the grooves formed at the interior surface 24 of axle shaft 21.

The flange plates 22a,b are rigidly fixed to axle shaft 21 of axle assembly 20 at opposite ends. The flange plates 22a,b are identically constructed. Each flange plate 22a has an annular shape that includes a central opening arranged in communication with the interior, longitudinal space 23 of sleeve-like axle shaft 21. The exemplary flange plate 22a includes an exterior, outer-facing side 26 where further components of wheel assembly 10 are mounted (as discussed further herein). The flange plate 22a includes a set 27 of peripheral, spaced-apart, threaded fastener holes 28 that function as a circular bolt-hole pattern or arrangement, which is used to facilitate the integral attachment of the components of wheel assembly 10 to flange plates 22a,b.

Referring to FIG. 3, the axle assembly 20 includes a pair of annular, disc-shaped seals 30a,b attached to the pair of flange plates 22a,b at their exterior, outer-facing side 26 in an axially-adjacent, planar, side-to-side contacting engagement. The seals 30a,b are identically, constructed. The exemplary seal 30a includes an exterior, outer-facing side 31 where further components of wheel assembly 10 are mounted. The seal 30a includes a central opening 32 arranged in axial communication with the central opening of flange plate 22a and the interior, longitudinal space 23 of axle shaft 21. The central opening 32 of seal 30a defines an inner, peripheral, circular edge 33 that includes a set of splines 34 formed therein that align with the longitudinal splines 25 formed in the interior surface 24 of axle shaft 21 to facilitate the installation of wheel assembly 10 on a vehicle motor axle. The seal 30a includes a set 35 of peripheral, spaced-apart, unthreaded through-holes 36 that align with the set 27 of threaded fastener holes 28 formed in the adjacent flange plate 22a. As shown, seal 30a is preferably sized and shaped with a diameter larger than the adjacent flange plate 22a in order to provide a suitable and effective sealing action.

Figure 4:
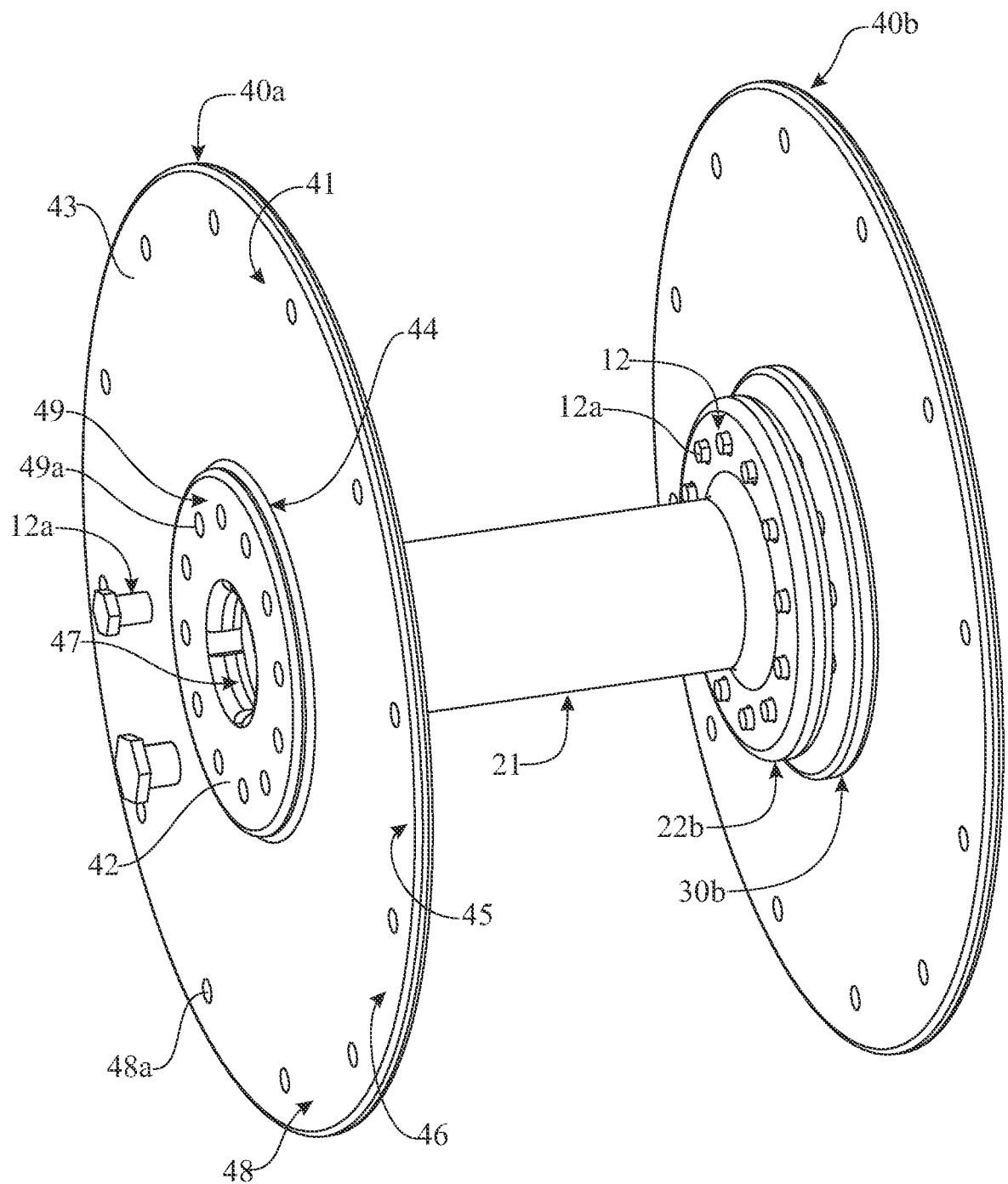
FIG. 4 presents a longitudinal, perspective view of the partially constructed wheel arrangement shown in FIG. 3 further configured with a pair of end-mounted planar discs attached to the seal and flange plate combination.
Figure 5:
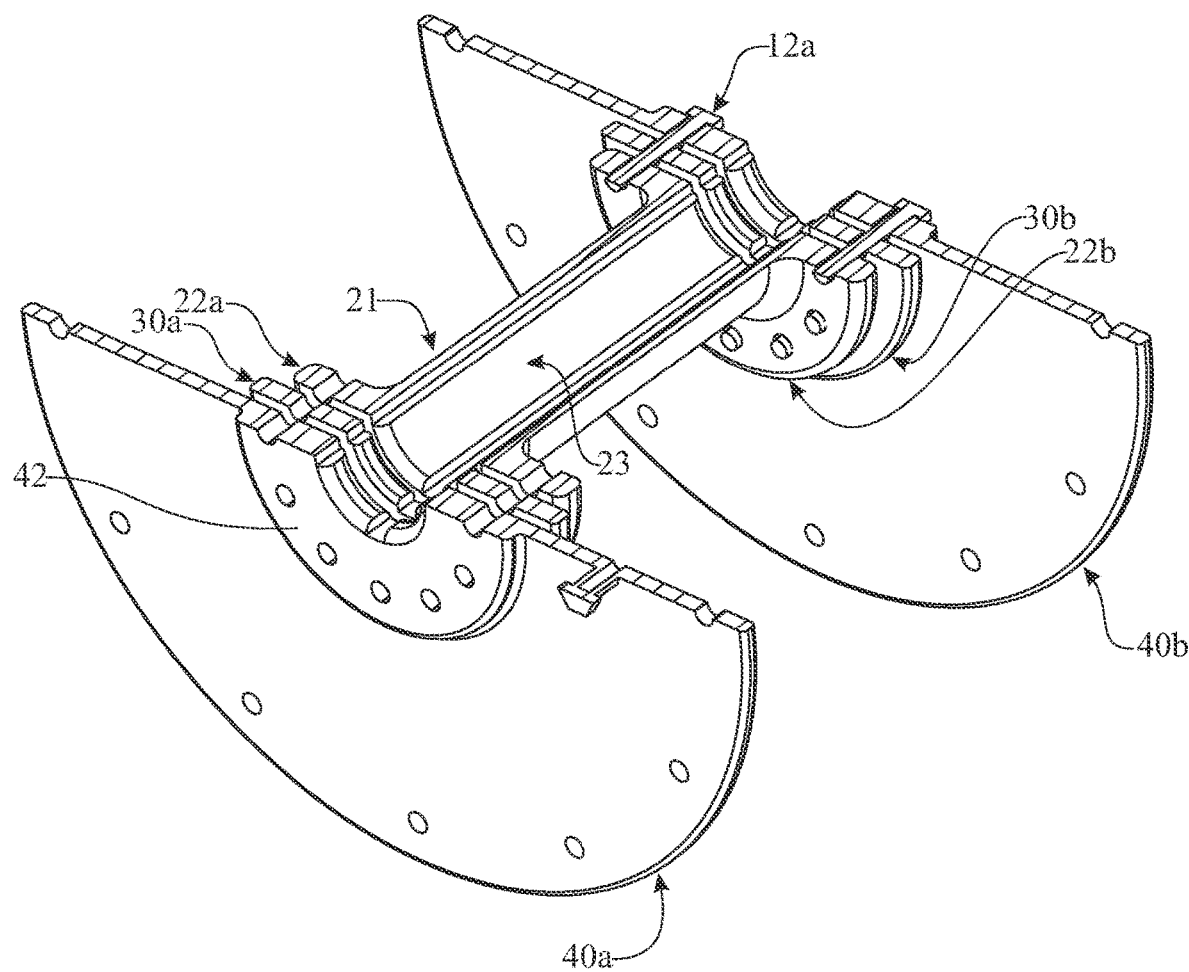
FIG. 5 presents a perspective, transverse sectional view taken through a mid-plane of the partially constructed wheel arrangement shown in FIG. 4.

Referring now to FIGS. 4 and 5, with continuing reference to FIGS. 1-3, wheel assembly 10 further includes a pair of mounting discs 40a,b attached to the pair of seals 30a,b at their exterior, outer-facing side 31 in an axially-adjacent, planar, side-to-side contacting engagement. The mounting discs 40a,b are identically constructed. The exemplary mounting disc 40a includes a generally planar body 41 including, in combination, an inner, raised annular portion 42 defining a central opening 47; an outer annular portion 43 having an outer peripheral edge 46; and, a shoulder 44 interconnecting the inner annular portion 42 and the outer annular portion 43 of body 41. The mounting disc 40a includes an exterior, outer-facing side 45. As shown, mounting disc 40b is preferably sized and shaped with a diameter larger than the adjacent seal 30b, which reflects the load-bearing functionality of mounting discs 40a,b as the principal components for supporting the tire, as discussed further.

Figure 11:
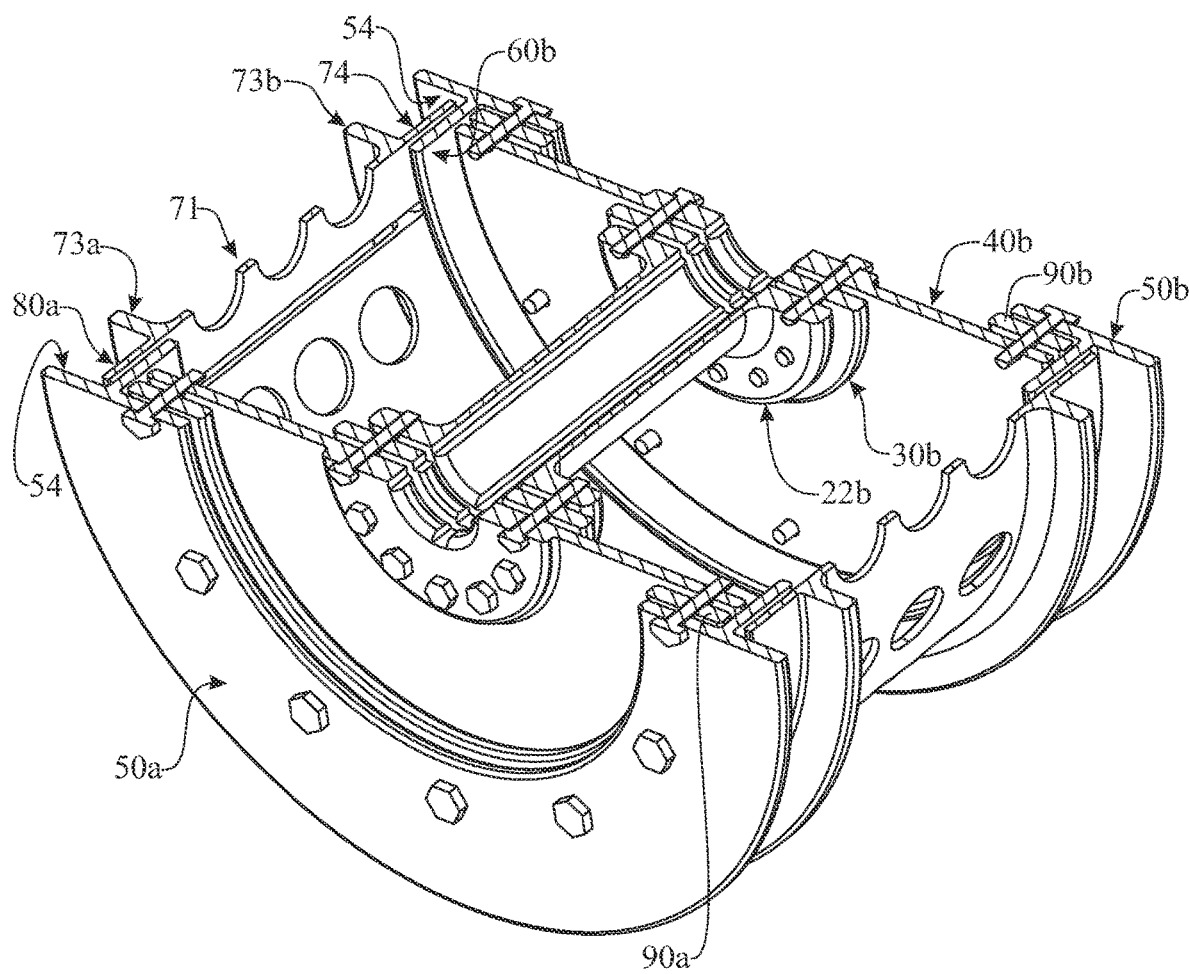
FIG. 11 presents a perspective, transverse sectional view taken through a mid-plane of the constructed wheel arrangement shown in FIG. 10, illustrating the formation of an annular tire-receiving and tire-retaining channel formed by the spaced-apart relationship between an annular face of the locking ring and an opposing, radially-extending flange portion of the perforated insert section.

The mounting disc 40a includes a circular pattern or set 49 of radially-inner, spaced-apart, unthreaded holes 49a formed in the inner annular portion 42 of body 41, and a circular pattern or set 48 of radially-outer, spaced-apart, threaded holes 48a formed in the outer annular portion 43 of body 41. The set 49 of radially-inner unthreaded holes 49a align cooperatively with the set 35 of unthreaded through-holes 36 formed in the immediately adjacent seal 30a and the set 27 of threaded fastener holes 28 formed in the next-adjacent flange plate 22a, as best shown in FIG. 5. Referring briefly to FIG. 11, a pair of annular-shaped mounting seals 90a,b are preferably attached to the pair of mounting discs 40a,b at their exterior, outer-facing side 45 in an axially-adjacent, side-to-side contacting engagement. In one form, the mounting seals 90a,b have the same diameter as the mounting discs 40a,b.

Figure 6:
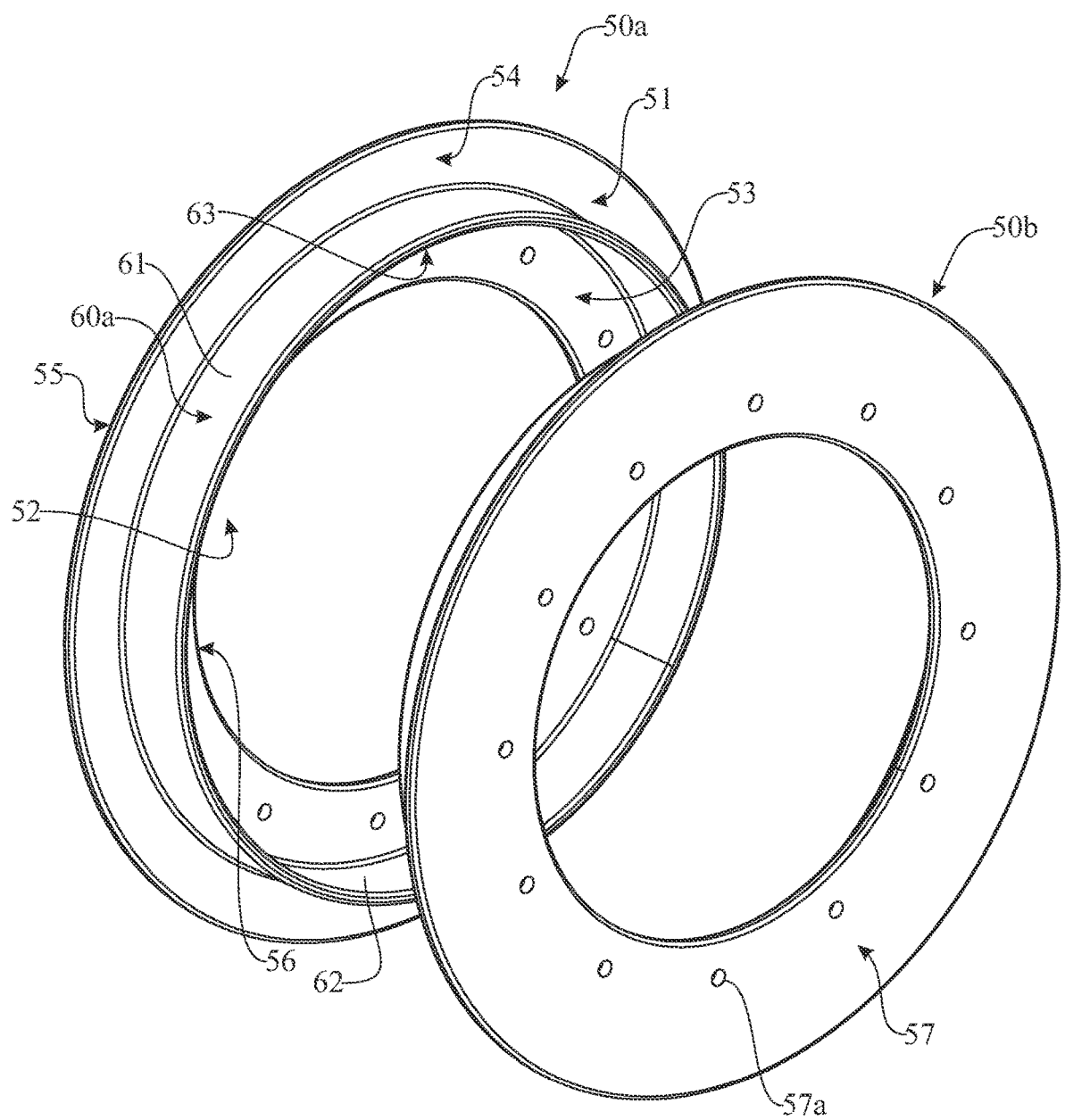
FIG. 6 presents a perspective view of a pair of tire-supporting locking rings forming part of the wheel assembly originally disclosed in FIG. 1.
Figure 7:
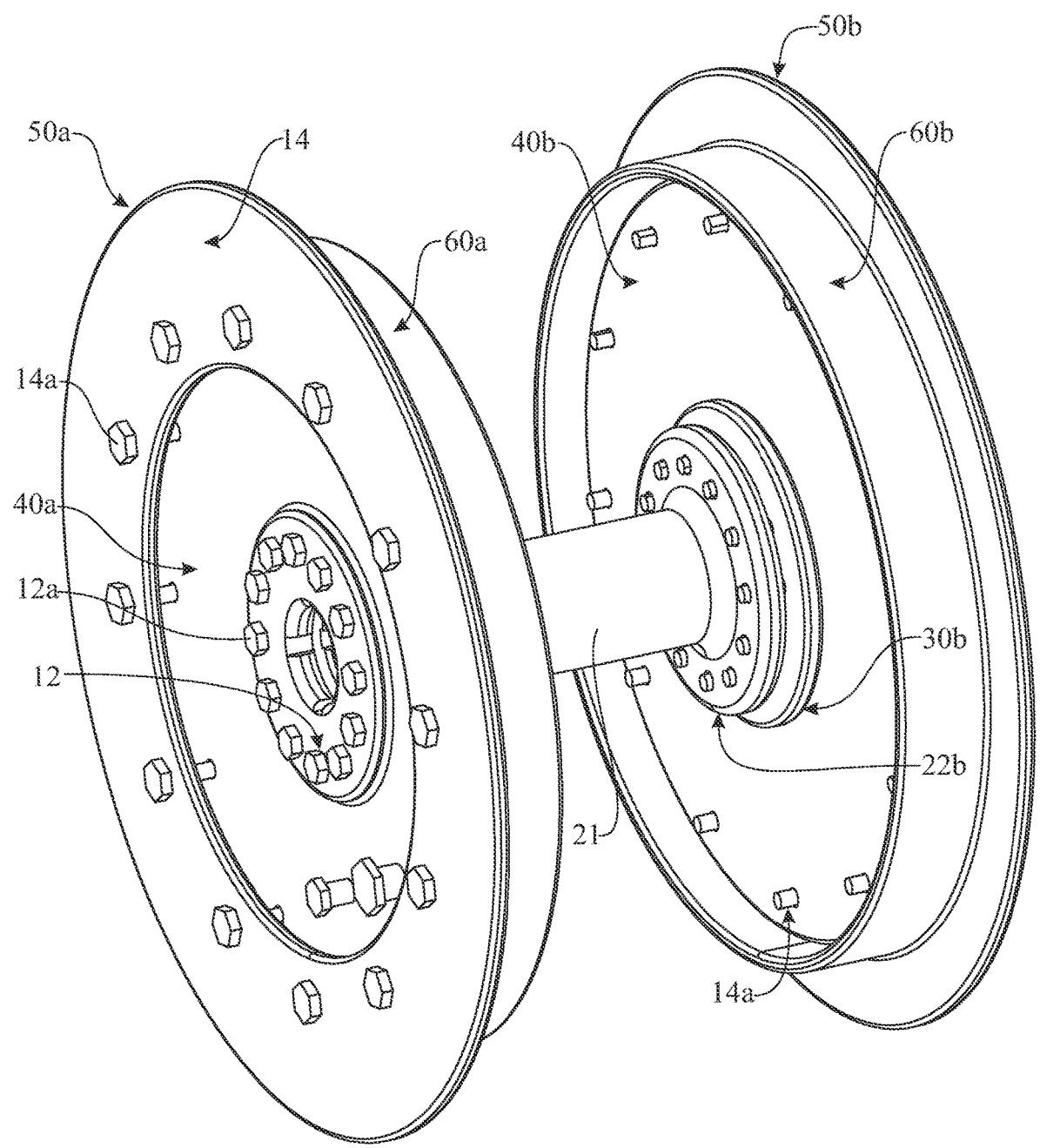
FIG. 7 presents a longitudinal, perspective view of the partially constructed wheel arrangement disclosed in FIG. 4 further configured with the locking rings shown in FIG. 6 mounted to the planar discs.
Figure 8:
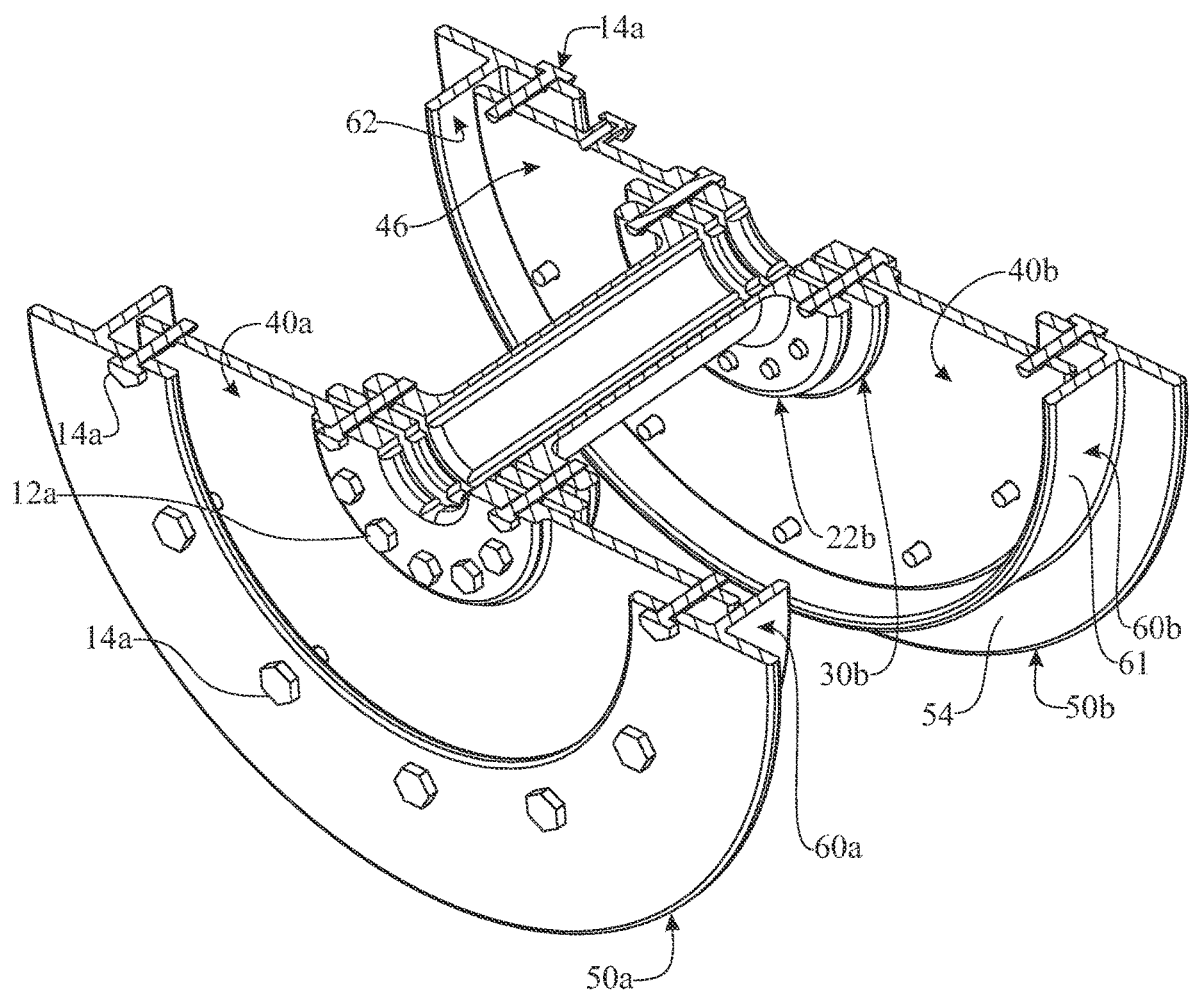
FIG. 8 presents a perspective, transverse sectional view taken through a mid-plane of the arrangement shown in FIG. 7.

Referring now to FIGS. 6-8, wheel assembly 10 further includes a pair of annular locking rings 50a,b attached to the pair of mounting discs 40a,b at their exterior, outer-facing side 45 in an axially-adjacent relationship. The locking rings 50a,b are identically constructed. The exemplary locking ring 50a includes an inner-radius peripheral edge 56 defining a central opening 52 and an outer-radius peripheral edge 55. The locking rings 50a,b include a pair of annular, inward-directed, axially-extending, continuous flange ribs, ridges or collars 60a,b projecting orthogonally from the planar, inner-facing side 51 of locking rings 50a,b. The exemplary flange rib 60a divides or sections the inner-facing side 51 of locking ring 50a into an inner annular portion 53 disposed radially-inward of annular flange rib 60a and an outer annular portion 54 disposed radially-outward of annular flange rib 60a. The flange rib 60a includes a terminal edge 63, an outer-facing surface 61, and an inner-facing surface 62.

During assembly, the annular locking rings 50a,b are located on the mounting discs 40a,b (and seals 900) so that the mounting discs 40a,b engage the inner annular portion 53 of locking rings 50a,b. In particular, the mounting discs 40a,b are located concentrically inside the pair of flange ribs 60a,b of respective locking rings 50a,b, so that the flange ribs 60a,b surround the outer peripheral edge 46 of discs 40a,b. A circular pattern or set 57 of unthreaded, spaced-apart, through-holes 57a is formed in the inner annular portion 53 of locking ring 50a, which align with the set 48 of threaded, radially-outer holes 48a formed in the adjacent mounting disc 40a, Referring to FIGS. 7 and 8, the locking rings 50a,b are fastened to the adjacent mounting discs 40a,b using a set 14 of outer mounting bolts 14a that are, first, inserted through the set 57 of unthreaded bolt holes 57a formed in locking rings 50a,b and, second, threaded into the set 48 of threaded outer fastener holes 48a formed in mounting discs 40a,b. The fastened combination of locking rings 50a,b and mounting discs 40a,b is then fastened as a unit to axle assembly 20 in the following manner. A set 12 of inner mounting bolts 12a are, first, inserted through the set 49 of unthreaded bolt holes 49a formed in the inner annular portion 42 of mounting discs 40a,b; second, inserted through the set 35 of unthreaded bolt holes 36 formed in seals 30a,b; and, third, threaded into the set 27 of threaded fastener holes 28 formed in flange plates 22a,b. At this point, wheel assembly 10 includes an integrated arrangement including axle shaft 21 and a pair of identical end configurations coupled to the ends of axle shaft 21, which comprise, in sequence, a pair of flange plates 22a,b, a pair of seals 30a,b, a pair of mounting discs 40a,b, a pair of seals 90a,b, and a pair of annular locking rings 50a,b. Although the wheel assembly 10 is shown with a pair of inner seals 30a,b interposed between flanges 22a,b and mounting discs 40a,b, this design choice is optional though beneficial. Moreover, although wheel assembly 10 is additionally shown with a pair of outer seals 90a,b interposed between mounting discs 40a,b and locking rings 50a,b, this design choice is optional though beneficial.

Figure 9:
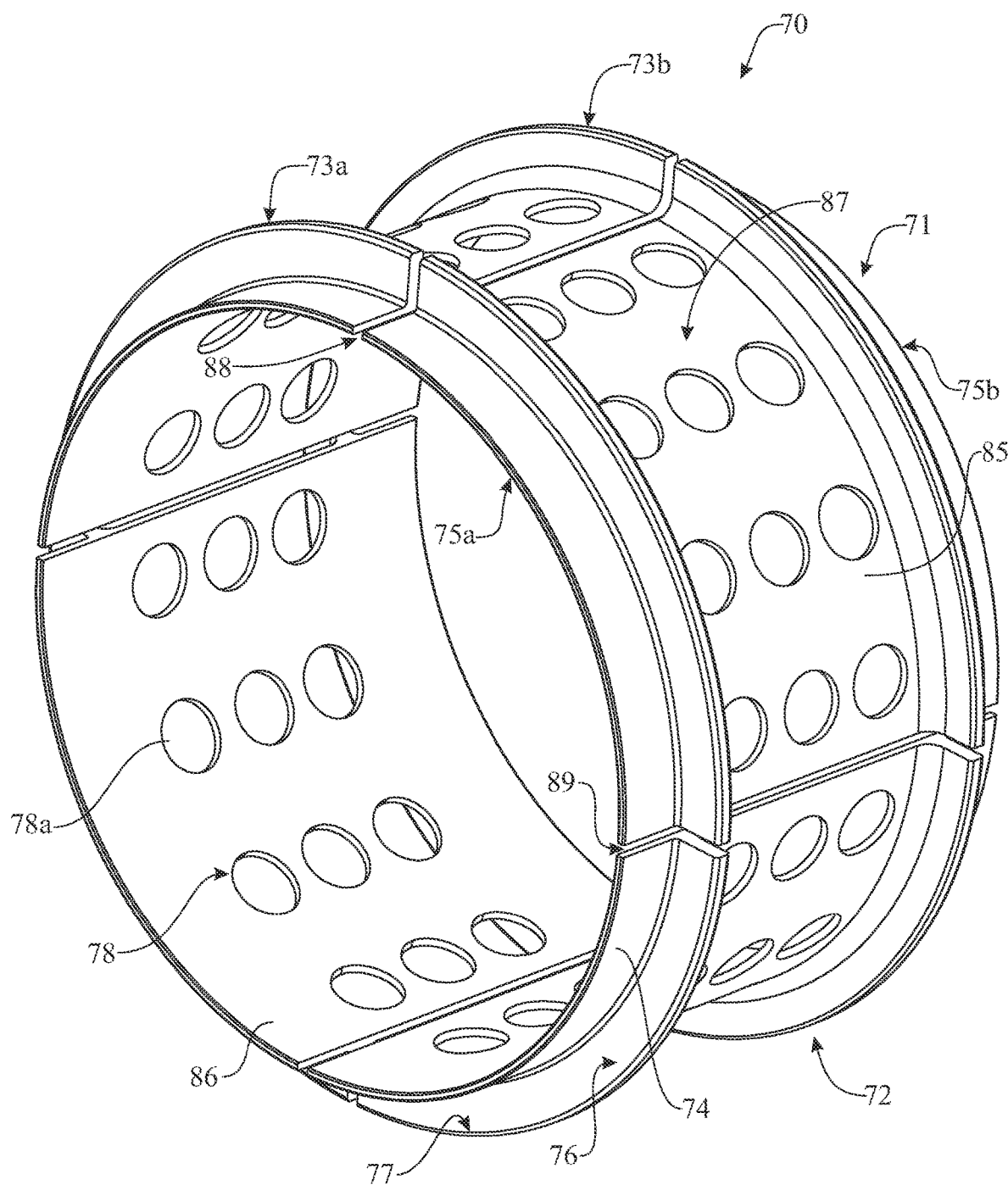
FIG. 9 presents a perspective view of the set of perforated insert sections forming part of the wheel assembly originally disclosed in FIG. 1, illustrating how the insert sections integrally form a cylindrical arrangement when pieced together.
Figure 10:
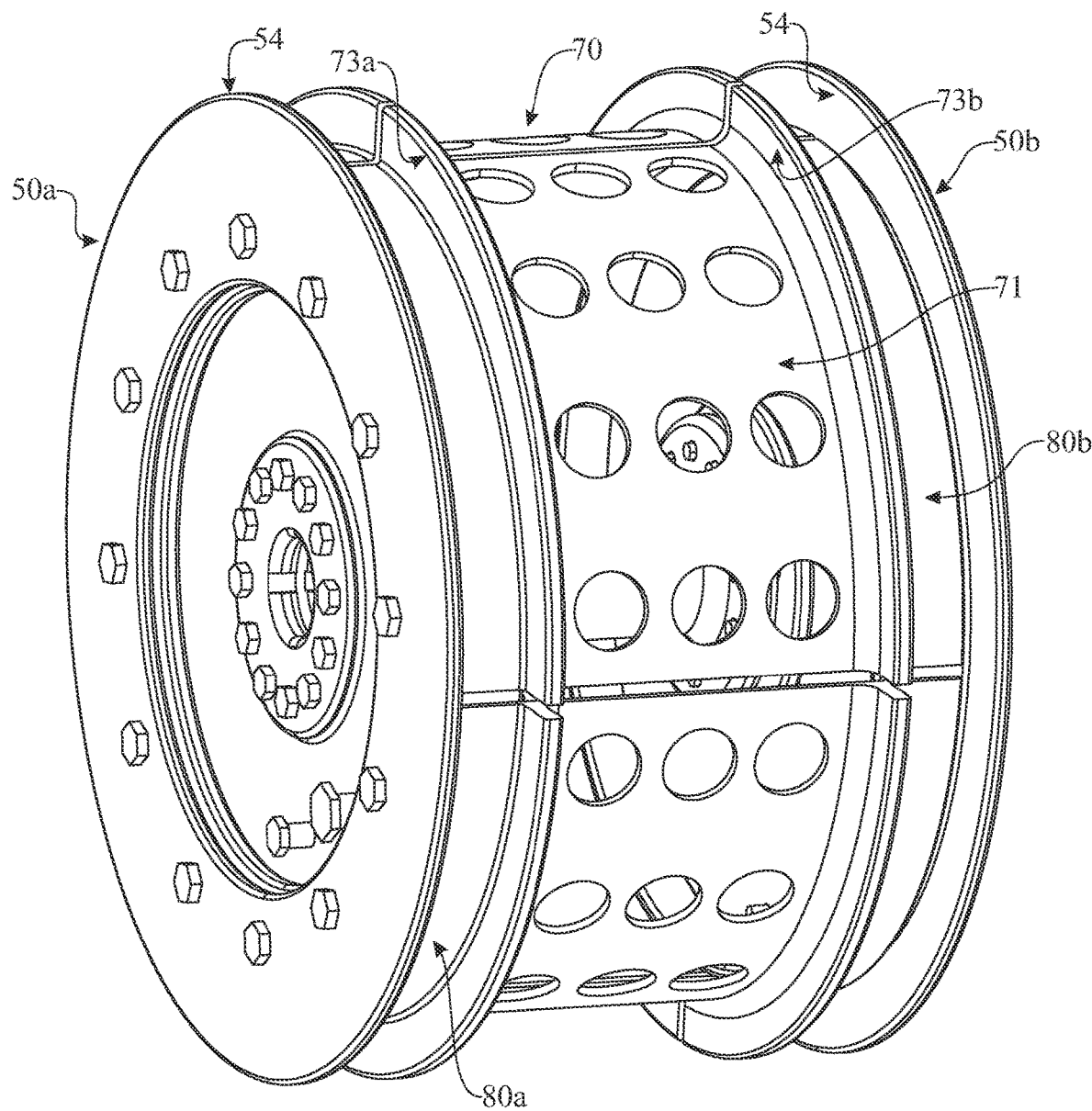
FIG. 10 presents a longitudinal, perspective view of the partially constructed wheel arrangement shown in FIG. 7 further configured with the set of perforated insert sections shown in FIG. 9 circumferentially seated on an inwardly-directed, axially-extending, annular projection portion of the locking rings.

Referring now to FIGS. 9-11, with continuing reference to FIG. 1, wheel assembly 10 includes a cylindrical tire-insert assembly 70 that is partitioned or sectioned into a set of individual insert sections 71 that cooperatively function as an integrated, drum-like or hub-like unit. For purposes of description, reference is made to the features of the complete unit of tire-insert assembly 70 as representative of the corresponding features applicable to each subunit or insert section 71. The tire-insert assembly 70 includes a cylindrical body 72 in the form of a tubular or drum-like structure having a pair of circular, peripheral end edges 75a,b defining a terminus of body 72 at both of its axial ends. The tubular body 72 includes an outer-facing side 85 and an inner-facing side 86. The tire-insert assembly 70 includes a pair of annular, axially spaced-apart, radially-extending, outward-directed, flange wall portions or ridges 73a,b projecting from the outer side 85 of tubular body 72. The radially-extending flange wall portions 73a,b are spaced-apart from the end edges 75a,b and segment or divide the outer side 85 of tubular body 72 into a central portion 87 extending between the pair of flange wall portions 73a,b and an outer annular portion 74 disposed axially outward of each flange wall portion 73a,b Each radially-extending flange wall portion 73a,b includes an axially outer-facing side 76 and an upper peripheral edge 77. The central portion 87 of tubular body 72 includes a set 78 of perforations or holes 78a formed in tubular body 72, which may be circular or any other suitable shape.

Referring now to FIGS. 10 and 11, wheel assembly 10 is shown with the cylindrical tire-insert assembly 70 disposed between the pair of units mounted to each end of the axle shaft 21. In particular, the cylindrical tire-insert assembly 70 is mounted concentrically about the axle shaft 21 and disposed in adjacent relationship to the pair of locking rings 50a,b. As so assembled, the cylindrical tire-insert assembly 70 is disposed concentrically and radially outward of the pair of annular, axially-extending, flange ribs 60a,b projecting from the inner side 51 of locking rings 50a,b. In particular, the outer annular portion 74 at both axial ends of tubular body 72 of tire-insert assembly 70 is seated at a radially-outward location on the pair of annular, axially-extending, flange ribs 60a,b of locking rings 50a,b, in an overlapping arrangement. In this configuration, the peripheral axial end edges 75a,b of tubular body 72 of cylindrical tire-insert assembly 70 abut against the inner-facing side 51 of locking rings 50a,b at the outer annular portion 54. Moreover, in this adjacent spatial relationship between the tire-insert assembly 70 and locking rings 50a,b, each one of the pair of annular, radially-extending, outward-projecting flange wall portions 73a,b of cylindrical tire-insert assembly 70 is disposed in opposing, facing, spaced-apart relationship to the annular outer portion 54 at the inner-facing side 51 of an adjacent locking ring 50a,b, to define an annular, tire bead-receiving channel 80a,b therebetween. The channel 800 forms a cylindrical flute, groove or slot to receive and locate the bead structure of a mounted tire.

Figure 12:
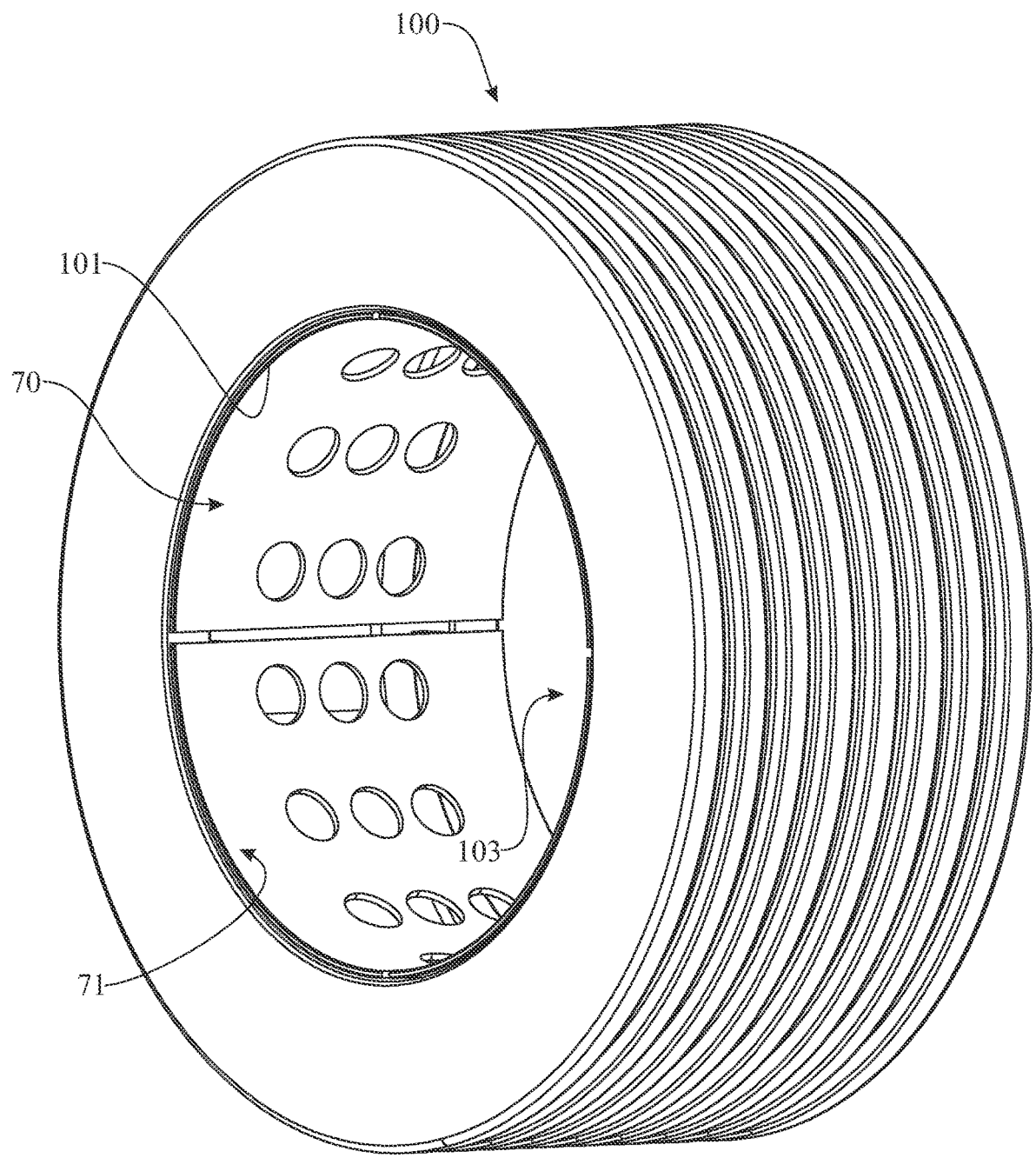
FIG. 12 presents a perspective view of a tire loaded with the assembled set of perforated insert sections shown in FIG. 9, as a preliminary step to installation of the tire on the wheel assembly of the present invention.
Figure 13:
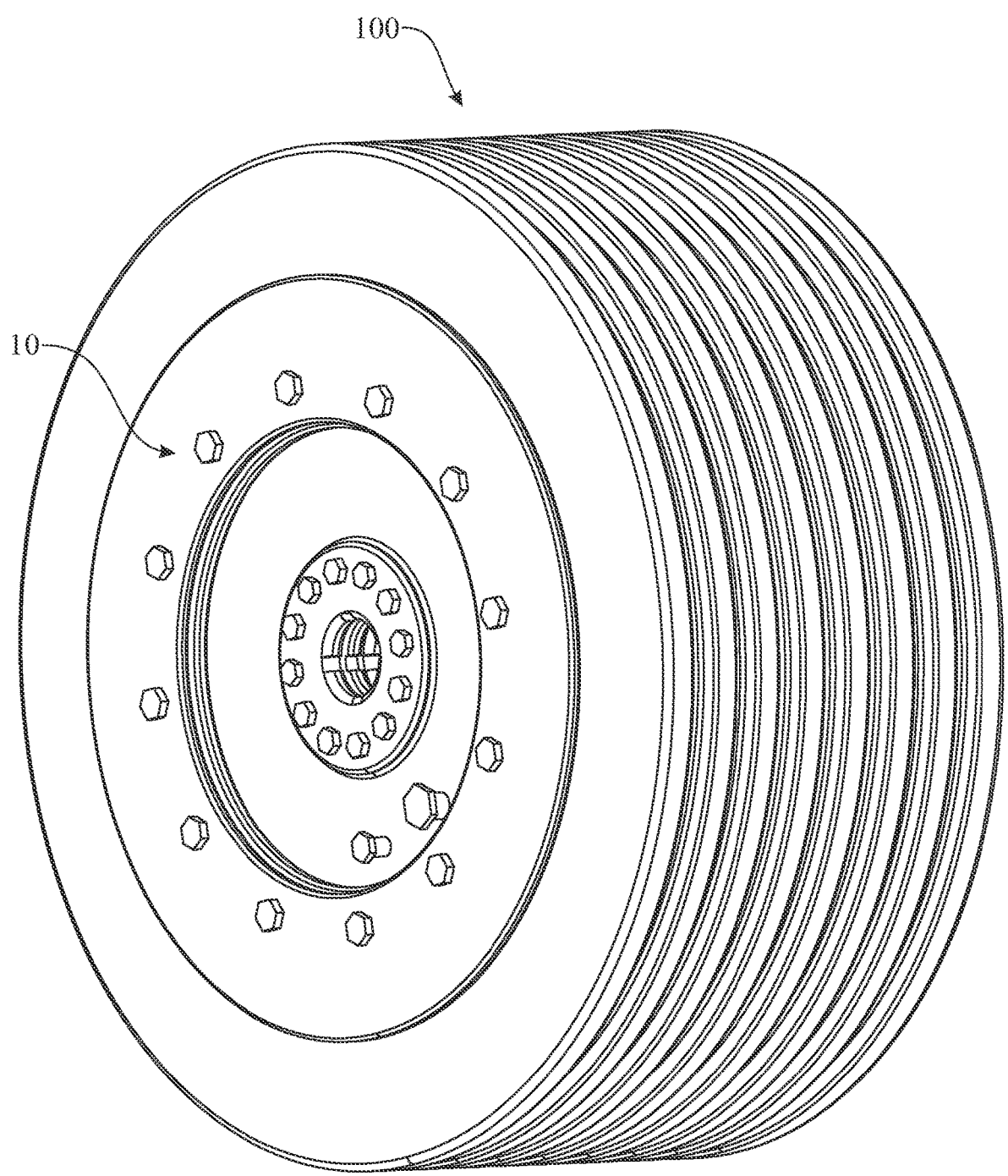
FIG. 13 presents a perspective view of the partially constructed wheel arrangement shown in FIG. 7 loaded with the tire and insert combination shown in FIG. 12, forming a fully, assembled tire and wheel combination incorporating the wheel assembly according to the first embodiment of the present invention.
Figure 14:
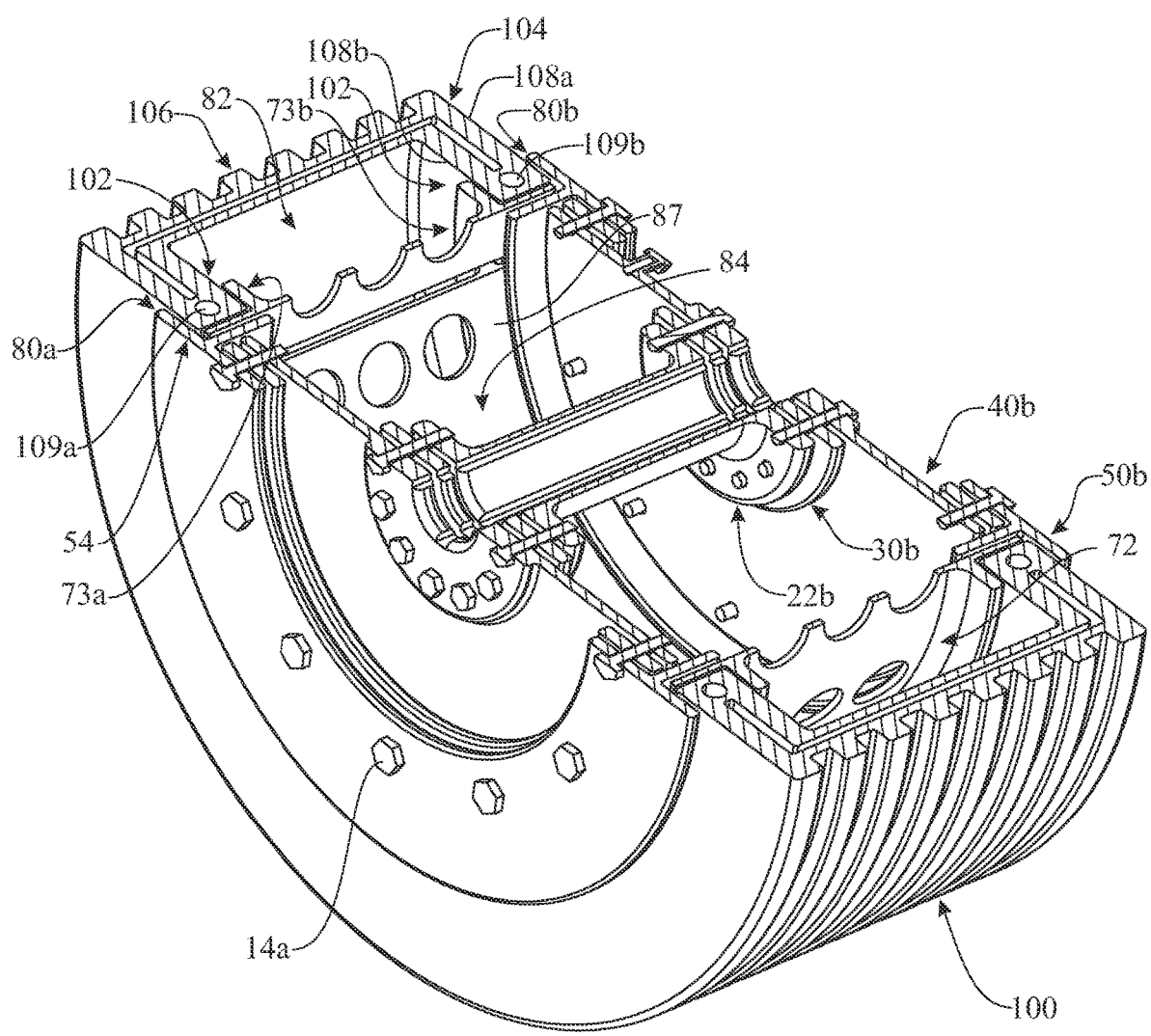
FIG. 14 presents a perspective, transverse sectional view taken through a mid-plane of the tire and wheel combination shown in FIG. 13, illustrating the location of the tire at its bead assembly within the annular tire-receiving and tire-retaining channel depicted especially in FIG. 11.

Referring now to FIGS. 12-14, the mounting of tubeless tire 100 to wheel assembly 10 is disclosed. In a conventional manner, tire 100 includes a central opening 103 defined at its periphery by a circular inner edge 101 at both sides of tire 100. The tire 100 includes a tire sidewall 104 extending between tire tread area 106 and a tire bead area 102 having outer and inner sides 108a,b, respectively. The tire bead area 102 includes a tire bead assembly 109a,b that runs along the inner tire edge 101 at both sides of tire 100. The tire 100 is mounted to wheel assembly 10 so that each tire bead assembly 109a,b is located within annular tire bead-receiving channels 800, respectively. In this location, the exemplary tire bead assembly 109b is situated within annular channel 80b so that the tire bead assembly 109b at its outer side 108a is disposed in flush, abutting engagement against the annular outer portion 54 of locking ring 50b, and the tire bead assembly 109b at its inner side 108b is disposed in flush, abutting engagement against the radially-extending, outward-projecting flange wall portion 73b of tire-insert assembly 70. The tire bead assembly 109a,b is press fit between the locking rings 50a,b and the tire-insert assembly 70 to provide an air-tight sealing engagement. The amount of pressure applied by the press fit connection can be controlled by changing the torque applied to the outer mounting bolts 14a, The manner of capturing the tire bead assembly 109a,b between the tire-insert assembly 70 and the pair of locking rings 50a,b performs a clamp-like action that maintains the tire 100 in a stable position and provides an air-tight sealing engagement. The wheel assembly 100 is preferably designed so that the annular tire bead-receiving channels 80a,b capture not only the tire bead assembly 109a,b at the inner edge of the tire, but at least part of the sidewall 104 (at both the outer and inner sides 108a,b), which greatly enhances the mounting support afforded to tire 100.

The tire-wheel combination provides a dual air-pressurization cavity. Referring to FIG. 14, a first, air-pressurizable, outer chamber or compartment 82 is defined radially outward of the perforated, central portion 87 of tubular body 72 of the cylindrical tire-insert assembly 100, and a second, air-pressurizable, inner chamber or compartment 84 is defined radially inward of the central portion 87 of tubular body 72 of tire-insert assembly 100. The inner chamber 84 is disposed in fluid communication with the outer chamber 82 via the set 78 of holes 78a formed in central portion 87 of tubular body 72. In this way, as the first, outer chamber 82 is pressurized (due to the location of the air valve on tire 100), the second, inner chamber 84 will be simultaneously pressurized. The outer chamber 82, in particular, extends between the outer-facing side 85 of tubular body 72 (at central portion 87) of cylindrical tire-insert assembly 100 and an interior surface of the mounted tire 100. The inner chamber 84, in particular, extends between the inner-facing side 86 of tubular body 72 (at central portion 87) of cylindrical tire-insert assembly 100 and axle shaft 21. The tire wheel combination may also include a fluid valve 12b (FIG. 1) that is intended to allow the injection of a fluid other than air into the wheel to pressurize the inner chamber 84.

Figure 15:
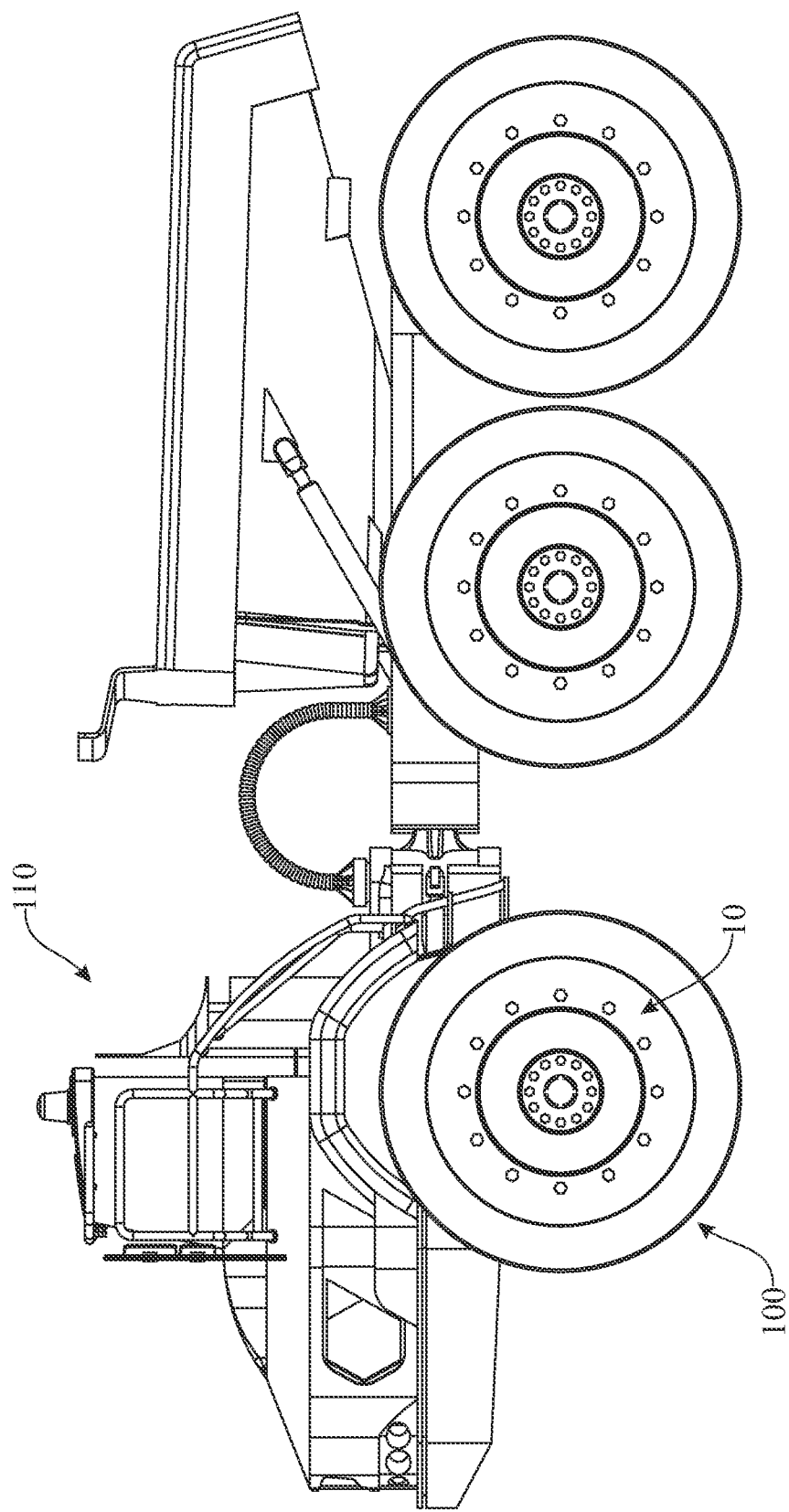
FIG. 15 is a side elevation view of a heavy-duty vehicle equipped with the assembled tire and wheel combination shown in FIG. 13, illustrating one industrial-style application environment of the present invention.

Referring to FIGS. 9 and 12, the cylindrical tire-insert assembly 70 is preferably partitioned, segmented or sectioned into a set of individual, identical insert sections 71 that collectively and cooperatively form the tubular body 72, The partitioning leaves each individual insert section 71 with a pair of longitudinal, axially-extending side edges 88 and 89 that extend between the pair of curved end edges 750 (FIG. 9). The partitioning is necessary because it makes the assembly process easier, in which tire 100 is first loaded with cylindrical tire-insert assembly 70 prior to its installation on wheel assembly 100. As shown in FIG. 12, the tubeless tire 100 is loaded with tire-insert assembly 70 in pieces (section-by-section), maneuvering each individual insert section 71 into place until the complete drum-like unit is installed. In the installation configuration, the cylindrical tire-insert assembly 70 is arranged so that the pair of opposite, radially-extending, outward-projecting flange wall portions 73a,b, which form a substantially continuous annular ridge when the multiple insert sections 71 are connected end-to-end, are located inside of the inner tire edge 101 at a respective side of tire 100, with the tire bead assembly 109a,b seated or resting on the outer annular portion 74 of tubular body 72 at both ends. The assembled arrangement or stage of wheel assembly 100 shown in FIG. 7 is already installed on a vehicle 110, such as that depicted in FIG. 15. However, one of the locking rings 50a,b is removed to make room for the tire and insert combination shown in FIG. 12. Once the tire and insert combination is loaded onto wheel assembly 100, producing the arrangement shown in FIGS. 13-14 (except for the removal of one locking ring 50a,b), the additional, unattached one of the locking rings 50a,b is mounted to wheel assembly 100 to complete the installation.

Wheel assembly 10 offers various advantages over conventional wheel arrangements. Briefly, by way of comparison, a conventional wheel includes a cylindrical shell or rim annularly mounted to a Wheel disc, which provides the attachment to the vehicle axle and hub. The rim supports and seals the tire at its inboard and outboard rim edges. The conventional drum-like rim has a solid continuous surface that forms the air pressurization chamber with the overlying tubeless tire. In the invention, by comparison, the entire volume enclosed by the mounted tire 100 is available for pressurization, owing to the nearly empty space enclosed by tire 100, which is occupied only by axle shaft 21 and the cylindrical tire-insert assembly 70. The wheel assembly 100 provides separate but connected air-pressurization chambers both radially outward and radially inward of the tire-insert assembly 70, which is designed to permit fluid communication between the chambers and so pressurize them both in tandem. The tire 100 is thus able to be pressurized to levels far greater than that allowed by conventional rim designs, greatly increasing the load capacity of the tire. Additionally, wheel assembly 100 offers significant support to the sidewall area due to the way in which the tire bead at the inner tire edge is captured and otherwise located within an annular tire-receiving channel that is designed to engage both sides of the tire bead in a clamp-like, press fit action. This clamping action, in particular, is implemented by the press fit connection formed by the annular, radially-extending flanges of the tire-insert assembly 70 and the opposing, inner face of the locking rings 50a,b. Since tire 100 is well supported at its inner edges within the annular channel formed between the tire-insert assembly 70 and locking rings 50a,b, tire 100 can be made with a shorter sidewall.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A wheel assembly, comprising:
an axle assembly including an axle shaft, a pair of circular flange plates disposed at opposite ends of the axle shaft, and a pair of seals each disposed at an outer side of a respective flange plate;
a pair of mounting discs each disposed at the outer side of a respective seal of the axle assembly;
a pair of locking rings each disposed at the outer side of a respective mounting disc; and
a cylindrical insert assembly disposable between the pair of locking rings and generally positioned concentrically about the axle assembly to define a respective annular, tire bead-receiving channel therebetween.

2. The wheel assembly of claim 1, wherein each locking ring comprises,
an inner side,
an outer side,
a central opening extending between the inner side and the outer side, and
an annular, axially-extending, flange rib projecting from the inner side of the locking ring.

3. The wheel assembly of claim 2, wherein the inner side of the locking ring includes an annular outer portion disposed radially outward of the flange rib and an annular inner portion disposed radially inward of the flange rib.

4. The wheel assembly of claim 1, wherein the cylindrical insert, comprises:
a tubular body having an inner side and an outer side;
a pair of axially spaced-apart, annular, radially-extending, flange wall portions projecting from the outer side of the tubular body,
wherein the tubular body includes a central portion extending between the pair of flange wall portions and a pair of annular end portions each disposed axially outward of a respective flange wall portion; and
a plurality of holes formed in the central portion of the tubular body.

5. The wheel assembly of claim 1, the axle shaft of the axle assembly includes a hollow sleeve structure.

6. The wheel assembly of claim 5, wherein the hollow sleeve structure includes an interior surface formed with a plurality of axially-extending circumferentially spaced-apart, attachment splines.

7. The wheel assembly of claim 1, wherein the cylindrical insert assembly includes a partitioned portion cooperatively forming a tubular body.

8. The wheel assembly of claim 7, wherein the tubular body of the cylindrical insert is annularly seated in a radially-outward relationship about an annular, axially extending flange rib of the locking ring associated therewith.

9. The wheel assembly of claim 1, further comprises a tire having a central opening defined by a pair of inner edges each including a respective bead assembly that is at least partially disposable within the respective annular, tire bead-receiving channel.

10. The wheel assembly of claim 1, wherein a tire is disposable over the wheel assembly to provide a tire and wheel assembly, and the tire and wheel assembly is configured to provide a load capacity that falls between about 10 percent and 30 percent higher than other tire assemblies rated for 100 tons.

11. The wheel assembly of claim 1, wherein the wheel assembly provides for at least two pressurizable chambers.

12. The wheel assembly of claim 11, wherein the wheel assembly includes a first air-pressurizable outer chamber defined between an outer side of the cylindrical insert of the wheel assembly and an interior surface of a tire mountable thereon.

13. The wheel assembly of claim 11, wherein the wheel assembly includes a second air-pressurizable inner chamber defined by a space provided radially inward from a tubular body of the central insert assembly.

14. A wheel assembly, comprising:
an axle assembly including an axle shaft, a pair of circular flange plates disposed at opposite ends of the axle shaft, and a pair of seals each disposed at an outer side of a respective flange plate;
a pair of mounting discs each disposed at the outer side of a respective seal of the axle assembly;
a pair of locking rings each disposed at the outer side of a respective mounting disc, each locking ring including:
an inner side,
an outer side,
a central opening extending between the inner side and the outer side, and
an annular, axially-extending, flange rib projecting from the inner side of the locking ring,
wherein the inner side of the locking ring includes an annular outer portion disposed radially outward of the flange rib and an annular inner portion disposed radially inward of the flange rib;
a cylindrical insert assembly including,
a tubular body having an inner side and an outer side,
a pair of axially spaced-apart, annular, radially-extending, flange wall portions projecting from the outer side of the tubular body,
wherein the tubular body includes a central portion extending between the pair of flange wall portions and a pair of annular end portions each disposed axially outward of a respective flange wall portion, and
a plurality of holes formed in the central portion of the tubular body;
wherein the wheel assembly adopts an assembled configuration in which the cylindrical insert assembly is disposed between the pair of locking rings and generally concentric about the axle assembly so that each one of the pair of radially-extending flange wall portions of the cylindrical insert assembly is disposed in opposing, facing, spaced-apart relationship to the annular outer portion at the inner side of the locking ring associated therewith to define an annular, tire bead-receiving channel therebetween.

15. The wheel assembly of claim 14, wherein the wheel assembly includes a first, air-pressurizable outer chamber and a second air pressurizable inner chamber.

16. The wheel assembly of claim 15, wherein the first air-pressurizable outer chamber is in fluid communication with the second air-pressurizable inner chamber and is defined between an outer side of the cylindrical insert of the wheel assembly and an interior surface of a tire mountable thereon.

17. The wheel assembly of claim 15, wherein the second air-pressurizable inner chamber is in fluid communication with the first air-pressurizable outer chamber, and the second air-pressurizable inner chamber is defined by a space provided radially inward from a tubular body of the central insert assembly.

18. The wheel assembly of claim 14, wherein the cylindrical insert assembly includes a partitioned portion cooperatively forming the tubular body.

19. The wheel assembly of claim 14, wherein a tire is disposable over the wheel assembly to provide a tire and wheel assembly, and the tire and wheel assembly is configured to provide a load capacity that is about 10 percent higher than other tire assemblies rated for 100 tons.

20. A wheel and tire assembly, comprising:
- an axle assembly including an axle shaft, a pair of circular flange plates disposed at opposite ends of the axle shaft, and a pair of seals each disposed at an outer side of a respective flange plate;
- a pair of mounting discs each disposed at the outer side of a respective seal of the axle assembly;
- a pair of locking rings each disposed at the outer side of a respective mounting disc, each locking ring including:
  - an inner side,
  - an outer side,
  - a central opening extending between the inner side and the outer side, and
  - an annular, axially-extending, flange rib projecting from the inner side of the locking ring,
    - wherein the inner side of the locking ring includes an annular outer portion disposed radially outward of the flange rib and an annular inner portion disposed radially inward of the flange rib;
- a cylindrical insert assembly including,
  - a tubular body having an inner side and an outer side,
  - a pair of axially spaced-apart, annular, radially-extending, flange wall portions projecting from the outer side of the tubular body,
    - wherein the tubular body includes a central portion extending between the pair of flange wall portions and a pair of annular end portions each disposed axially outward of a respective flange wall portion, and
  - a plurality of holes formed in the central portion of the tubular body; and
- a tire having a central opening defined by a pair of inner edges each including a respective bead assembly that is at least partially disposable within the respective annular, tire bead-receiving channel,
  - wherein the wheel assembly adopts an assembled configuration in which the cylindrical insert assembly is disposed between the pair of locking rings and generally concentric about the axle assembly so that each one of the pair of radially-extending flange wall portions of the cylindrical insert assembly is disposed in opposing, facing, spaced-apart relationship to the annular outer portion at the inner side of the locking ring associated therewith to define an annular, tire bead-receiving channel therebetween,
  - wherein the wheel assembly includes a first, air-pressurizable outer chamber and a second air pressurizable inner chamber,
  - wherein the first air-pressurizable outer chamber is in fluid communication with the second air-pressurizable inner chamber and is defined between an outer side of the cylindrical insert of the wheel assembly and an interior surface of the tire, and
  - wherein the second air-pressurizable inner chamber is in fluid communication with the first air-pressurizable outer chamber, and the second air-pressurizable inner chamber is defined by a space provided radially inward from a tubular body of the central insert assembly.

\* \* \* \* \*